(12) United States Patent
Bernollin et al.

(10) Patent No.: US 6,608,254 B1
(45) Date of Patent: Aug. 19, 2003

(54) SEALING DEVICE OF THE GLAND TYPE FOR A CABLE

(75) Inventors: Rolland Bernollin, Grieges (FR); Jean Stobel, Villeneuve-la-Garenne (FR); Mathieu Vicot, Saint-Quentin (FR)

(73) Assignee: Cables Pirelli, Saint Maurice (FR)

( * ) Notice: Subject to any disclaimer, the term of this patent is extended or adjusted under 35 U.S.C. 154(b) by 0 days.

(21) Appl. No.: 09/562,031

(22) Filed: May 1, 2000

(30) Foreign Application Priority Data

Apr. 29, 1999 (FR) .............................................. 99 05467

(51) Int. Cl.[7] .............................. H01R 4/00; H02G 3/06
(52) U.S. Cl. ...................................... 174/84 R; 174/93
(58) Field of Search .................................. 174/85, 74 R, 174/77 R, 74 A, 76, 93, 79, 91, 92, 84 R

(56) References Cited

U.S. PATENT DOCUMENTS 5,783,778 A  7/1998  Foss et al. ................. 174/77 R

FOREIGN PATENT DOCUMENTS

| DE | 1 290 214 | 3/1969 |
|---|---|---|
| EP | 0 227 474 A2 | 7/1987 |
| FR | 2 680 055 A1 | 2/1993 |
| GB | 2 277 206 A | 10/1994 |

*Primary Examiner*—William H. Mayo, III
(74) *Attorney, Agent, or Firm*—Finnegan, Henderson, Farabow, Garrett & Dunner, L.L.P.

(57) ABSTRACT

A sealing device allows the passage of a submarine cable. The cable including a cable jacket, from a high-pressure volume corresponding to surrounding water into a low-pressure volume, particularly for a cable subjected to dynamic stresses. The sealing device includes a gland box system with at least two individual packing elements, each of the at least two individual packing elements in the form of an annular body made of an elastomer, having an inside diameter, and compressed axially within a gland box for the purpose of it being clamped radially inward against the cable jacket and outward against the gland box. In addition, the sealing device includes washers being inserted within the gland box between the at least two individual packing elements. The individual packing element of the at least two individual packing elements closest to the high-pressure volume includes an integral sleeve portion.

9 Claims, 1 Drawing Sheet

SEALING DEVICE OF THE GLAND TYPE FOR A CABLE

BACKGROUND OF THE INVENTION

The present invention relates to a sealing device for the passage of a cable between two volumes that are at different pressures, especially for the penetration of a submarine cable into a volume at a pressure less than the pressure of the surrounding water.

At the present time there are various systems for providing the sealed penetration of a submarine cable subjected to dynamic forces into a volume at a pressure less than the pressure of the surrounding water, for example in a submerged machine, a cabinet or any other volume.

The over-molding system, with or without bonding, which is not suitable for high pressures, is relatively bulky, requires special tooling, is relatively tricky to implement, cannot be dismantled without destroying it and, in the variant with bonding, cannot be used for all cable jacket materials.

The gland (called stuffing box) system, consisting in axially compressing several annular packing elements made of elastomer in a box for the purpose of gripping these elements radially inward against the cable jacket and outward against the box is likewise limited in pressure and is effective only in the short term, but does have the advantage of being able to be dismantled, of being more compact, of being not very expensive and of being able to be used for all cable jacket materials.

The so-called cuff system, comprising a cuff mounted on a metal insert, is suitable even for very high pressures, can be used for all cable jacket materials and is very effective over time, but is bulky, requires special tooling, is difficult to implement and cannot be dismantled.

The so-called equipressure system, which makes use of a volume of liquid maintained under pressure, is a system which is complex, bulky and difficult to implement.

SUMMARY OF THE INVENTION

The subject of the present invention is a cable sealing device, especially for the penetration of a submarine cable into a volume at a pressure less than the pressure of the surrounding water, this device making it possible, by very simple means, to remedy most of the difficulties and problems encountered with the known sealing systems mentioned above.

The sealing device forming the subject of the invention, for the passage of a cable between two volumes at different pressures, especially for the penetration of a submarine cable into a volume at a pressure less than the pressure of the surrounding water, comprises a gland with at least one packing element in the form of an annular body made of elastomer, compressed axially in a box for the purpose of it being clamped radially inward against the cable jacket and outward against the box. The annular element of the packing element closest to the high-pressure volume is extended, along its inside diameter, toward said volume by a sleeve which, in the manner of a cuff, surrounds and grips the cable jacket from the inside of the box of the gland right into the high-pressure volume.

This packing element with an integrated cuff combines the advantages of the gland system with the advantages of the cuff system, remedying at the same time most of the drawbacks of each of these two systems. The device is particularly simple, easy to implement, compact and able to withstand high pressure differences. Because of its compactness, it allows a particular cable which is fitted with it to be wound on the drum. No bonding of the cable jacket is necessary, as is the case for the usual cuff system. The device can therefore be dismantled without any problem and can be used in any cable jacket material whatsoever.

The sleeve forming the cuff has advantageously, at least at its free end, in the relaxed state, an inside diameter less than the outside diameter of the cable jacket.

Preferably, the sleeve forming the cuff has a length greater than its diameter, advantageously a length greater than the outside diameter of the annular body of the packing element of which it forms part, and preferably a length at least equal to twice this diameter.

The thickness of the sleeve forming the cuff is small compared with the radial thickness of the annular body of the packing element of which it forms part. The thickness of the sleeve is advantageously less than $\frac{1}{5}$ of the thickness of said annular body and preferably less than $\frac{1}{10}$ of the inside diameter of this annular body.

The sleeve may advantageously have the form of a truncated cone converging from the annular body toward its free end.

Advantageously, the sleeve may have an outside rim at its free end.

An illustrative and nonlimiting embodiment of a sealing device according to the invention will be described below in greater detail, with reference to the appended schematic drawings; in these drawings:

DETAILED DESCRIPTION OF THE PREFERRED EMBODIMENTS

Figure 1:
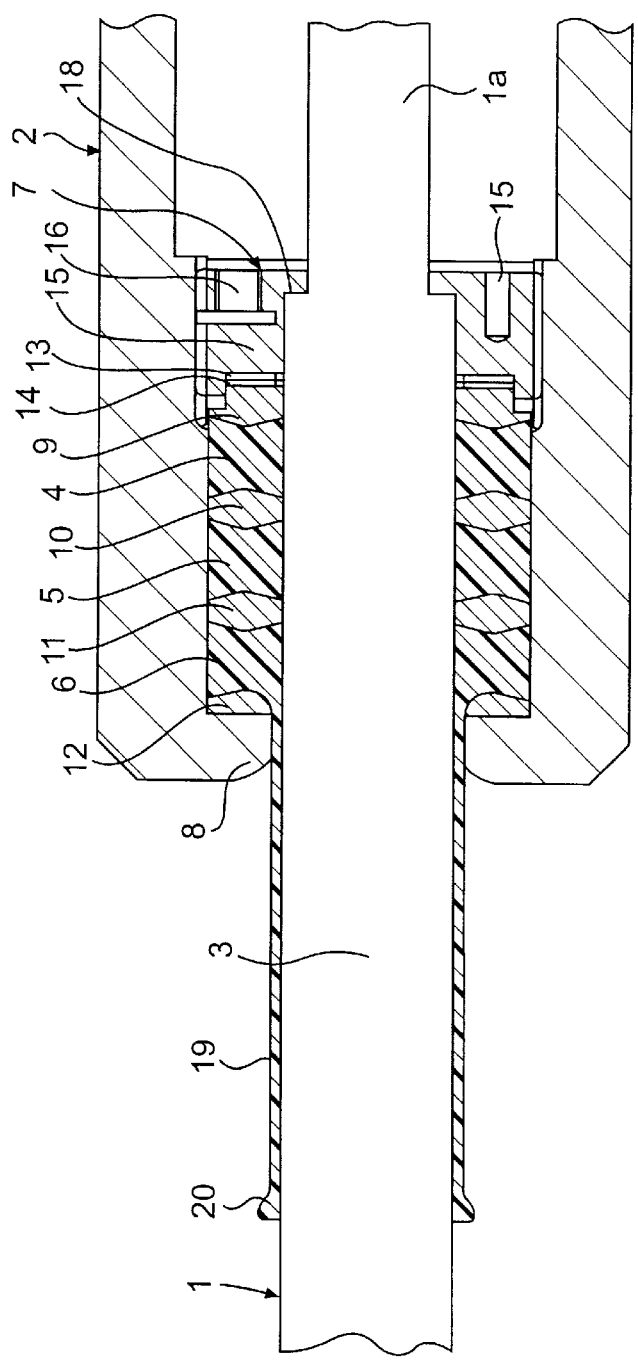
FIG. 1 is an axial section of a cable penetration sealed by a device according to the invention.

According to FIG. 1, the penetration of a cable 1, for example a submarine cable, into a volume at a pressure less than the pressure of the surrounding water, takes place through a sealing device comprising a gland box 2, formerly called a stuffing box. Three annular bodies 4, 5 and 6 forming packing elements are placed axially one behind the other between the jacket 3 of the cable 1 and the box 2, so as to be able to be axially compressed between a gland nut 7 and an internal rim 8 of the box. Washers 9, 10, 11, inserted between the gland nut 7 and the annular body 4, between the annular bodies 4, 5 and 6, and between the body 6 and the rim 8 of the box 2 respectively, because of their particular profile, favor the radial clamping of the bodies 4, 5, 6 due to the effect of the axial compression exerted by the gland nut 7 screwed into the box 2. Two washers 13, 14, made of antifriction material, are placed between the gland nut 7 and the washer 9, the gland nut 7 comprising, in a manner known per se, means 15, 16 for allowing, by rotation, it to be clamped and immobilized in the clamped position. Moreover, it should be noted that the gland nut 7 has a shoulder 18 serving as a stop for the jacket 3 of the cable 1, the core of which is reference 1a. Two washers 13, 14, made of antifriction material, are placed between the gland nut 7 and the washer 9. The gland nut 7 comprises, in a manner known per se, means 15, 16 for allowing, by rotation, it to be clamped and immobilized in the clamped position. Moreover, it should be noted that the gland nut 7 has a shoulder 18 serving as a stop for the jacket 3 of the cable 1, the core of which is reference 1a.

The annular body 6 of the packing element closest to the high-pressure volume (the surrounding water) is extended toward said volume along its inside diameter by a sleeve 19 made as one piece with the body 6, with a length greater than the outside diameter of the body 6. The sleeve 19 surrounds the jacket 3 of the cable 1, gripping it elastically. This gripping of the sleeve 19 against the cable 1 is reinforced, outside the box 2, by the pressure of the water which is exerted on the sleeve 19 and presses the latter against the jacket 3 more strongly the higher its pressure. At its free end, the sleeve 19 is reinforced on the outside by an annular rim 20.

Figure 2:
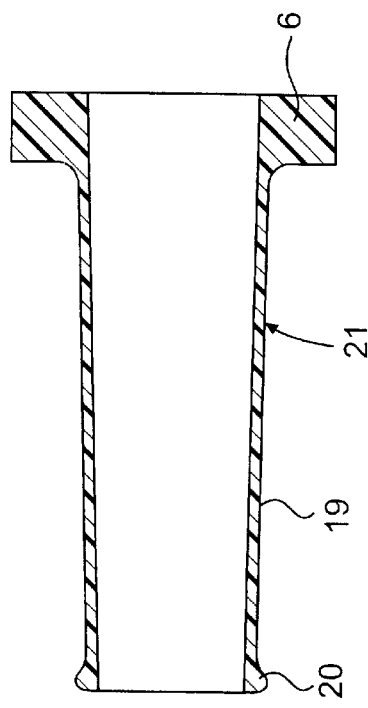
FIG. 2 is an axial section of the packing element with the sleeve forming the nipple, before it is mounted in the device of FIG. 1.

According to FIG. 2 which illustrates, before it is mounted in the sealing device, the unitary element 21 comprising the annular body 6 and the sleeve 19, the latter has the shape of a truncated cone converging from the annular body toward the free end reinforced by the rim 20. The inside diameter of the element 21 in line with the annular body 6 is slightly less than the outside diameter of the jacket 3 of the cable 1, the length of the sleeve 19 is equal to approximately four times the outside diameter of the jacket 3 of the cable 1 and the thickness of the sleeve 19 is less than $1/10$ of the outside diameter of the jacket 3 of the cable 1.

The element 21 in its entirety can be molded as a single part made of a cross-linked or not cross-linked elastomeric material having a favorable viscoelastic relaxation behaviour and a Shore A hardness comprised between about 30 and 90.

Suitable materials may be found in the following families:

Thermoplastic elastomers based on
   styrene (SIS, SBS, SEBS)
   polyester
   polyester-polyurethane, polyether-polyurethane (AU, EU)
   polyolefins (TPO);
Rubber-type elastomers such as
   natural rubber (NR)
   polychloroprene (CR)
   nitrile (NBR)
   chlorosulfonated polyethylene (CSM)
   silicone.

The choice of one among said materials is made according to the required viscoelastic features, hardness and natural resistance of the material against environmental attacks (by sea water, oils, etc.)

It may be noted that the lower hardness grades are preferred for sealing devices exposed to lower pressure differentials.

Good results for devices working under high pressure differentials under sea water have been obtained with elements made from polyurethane having a shore A hardness of 60.

This sealing device may be used in particular for submarine cables subjected to dynamic stresses, for example towed cables of the sonar type or other cables which may be complex cables, that is to say cables whose core 1a may combine electrical transmission means, hydraulic transmission means, fiber-optic transmission means, mechanical transmission means, etc.

What is claimed is:

1. A sealing device for the passage of a submarine cable having a cable jacket from a high-pressure volume corresponding to surrounding water into a low-pressure volume, particularly for a cable subjected to dynamic stresses, comprising:

a gland box system with at least two individual packing elements each of the at least two individual packing elements in the form of an annular body made of an elastomer, having an inside diameter, compressed axially within a gland box for the purpose of it being clamped radially inward against the cable jacket and outward against the gland box; and washers being inserted within the gland box between the at least two individual packing elements, wherein an individual packing element of the at least two individual packing elements closest to the high-pressure volume is a unitary element comprising an annular body extended, along its inside diameter, from inside the gland box into the high-pressure volume by an integral sleeve portion which has a cuff that surrounds and elastically grips the cable jacket from the inside of the gland box into the high-pressure volume, wherein the gripping of the cuff is reinforced outside the gland box by the pressure in the high-pressure volume exerted on the sleeve portion.

2. The device as claimed in claim 1, wherein said sleeve portion has, at least at a free end, in a relaxed state, an inside diameter less than the outside diameter of the cable jacket.

3. The device as claimed in claim 1 or 2, wherein said sleeve portion has a length greater than its diameter.

4. The device as claimed in claim 1, wherein said sleeve portion has a length greater than the outside diameter of the annular body of a packing element of which it forms part.

5. The device as claimed in claim 4, wherein said sleeve portion has a length approximately equal to twice the outside diameter of the annular body of either of said at least two individual packing elements.

6. The device as claimed in claim 1, wherein said sleeve portion has a thickness of less than $1/5$ of the radial thickness of the annular body of either of the at least two individual packing elements of which it forms part.

7. The device as claimed in claim 6, wherein said sleeve portion has a thickness of less than $1/10$ of the inside diameter of the annular body of either of the at least two individual packing elements of which it forms part.

8. The device as claimed in claim 1, wherein said sleeve portion is in the form of a truncated cone converging from the annular body of either of the at least two individual packing elements toward its free end.

9. The device as claimed in claim 1, wherein said sleeve portion has an outside rim at its free end.

* * * * *